United States Patent [19]

Lane et al.

[11] 4,428,191

[45] Jan. 31, 1984

[54] FUEL COMBUSTION IN DUCTED FLOW

[75] Inventors: Christopher D. Lane; Rodney A. Rowe, both of Bristol, England

[73] Assignee: Rolls Royce Limited, London, England

[21] Appl. No.: 400,956

[22] Filed: Oct. 1, 1964

[51] Int. Cl.³ .............................................. F02C 1/00
[52] U.S. Cl. ....................................... 60/737; 60/746; 60/749
[58] Field of Search ............. 60/39.65, 39.72, 35.6 RJ, 60/35.6 LL, 39.68, 733, 737, 746, 749, 750, 752

[56] References Cited

U.S. PATENT DOCUMENTS

| | | | |
|---|---|---|---|
| 2,826,039 | 3/1958 | Ashwood | 60/752 |
| 2,872,785 | 2/1959 | Barrett et al. | 60/749 |
| 3,030,773 | 4/1962 | Johnson | 60/749 |
| 3,055,178 | 9/1962 | Phillips | 60/737 |

*Primary Examiner*—Stephen C. Bentley
*Assistant Examiner*—Maureen T. Ryan
*Attorney, Agent, or Firm*—Parkhurst & Oliff

EXEMPLARY CLAIM

1. Combustion apparatus comprising a duct for containing a flow of air and including an air-fuel mixing device comprising an assembly of transversely spaced longeron members which extend along the duct and are inclined to the general direction of flow through the duct and to the walls of the duct so that a major portion of the flow through the duct will pass through the spaces between the longeron members, each longeron member having longitudinal edges adapted in operation to shed continuous vortices and a baffle extending across the upstream end of the longeron members and forming behind it a sheltered pilot combustion zone, and means adapted to generate pilot vortices of combustible mixture in the pilot zone, to cause each pilot vortex to divide, and to direct the divided portion of each pilot vortex to pass downstream along adjacent parts respectively of adjacent longeron members.

7 Claims, 10 Drawing Figures

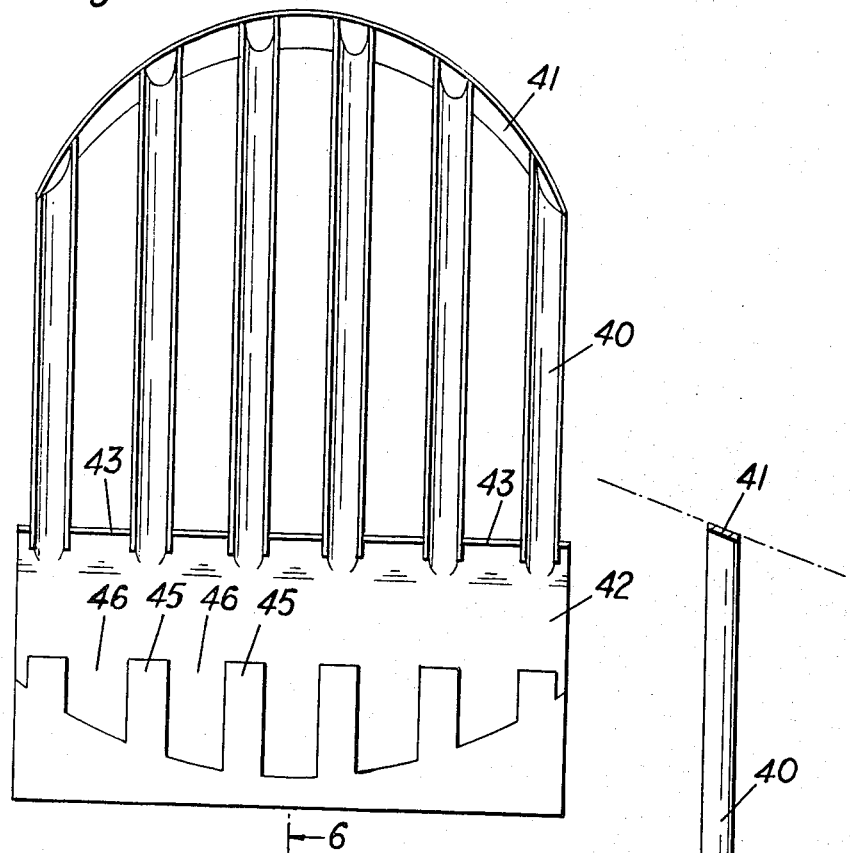
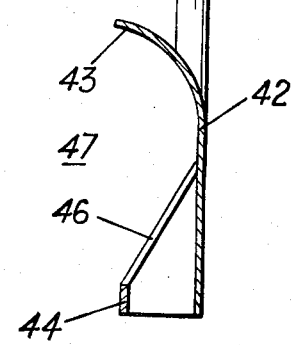
Fig. 5.
Fig. 6.

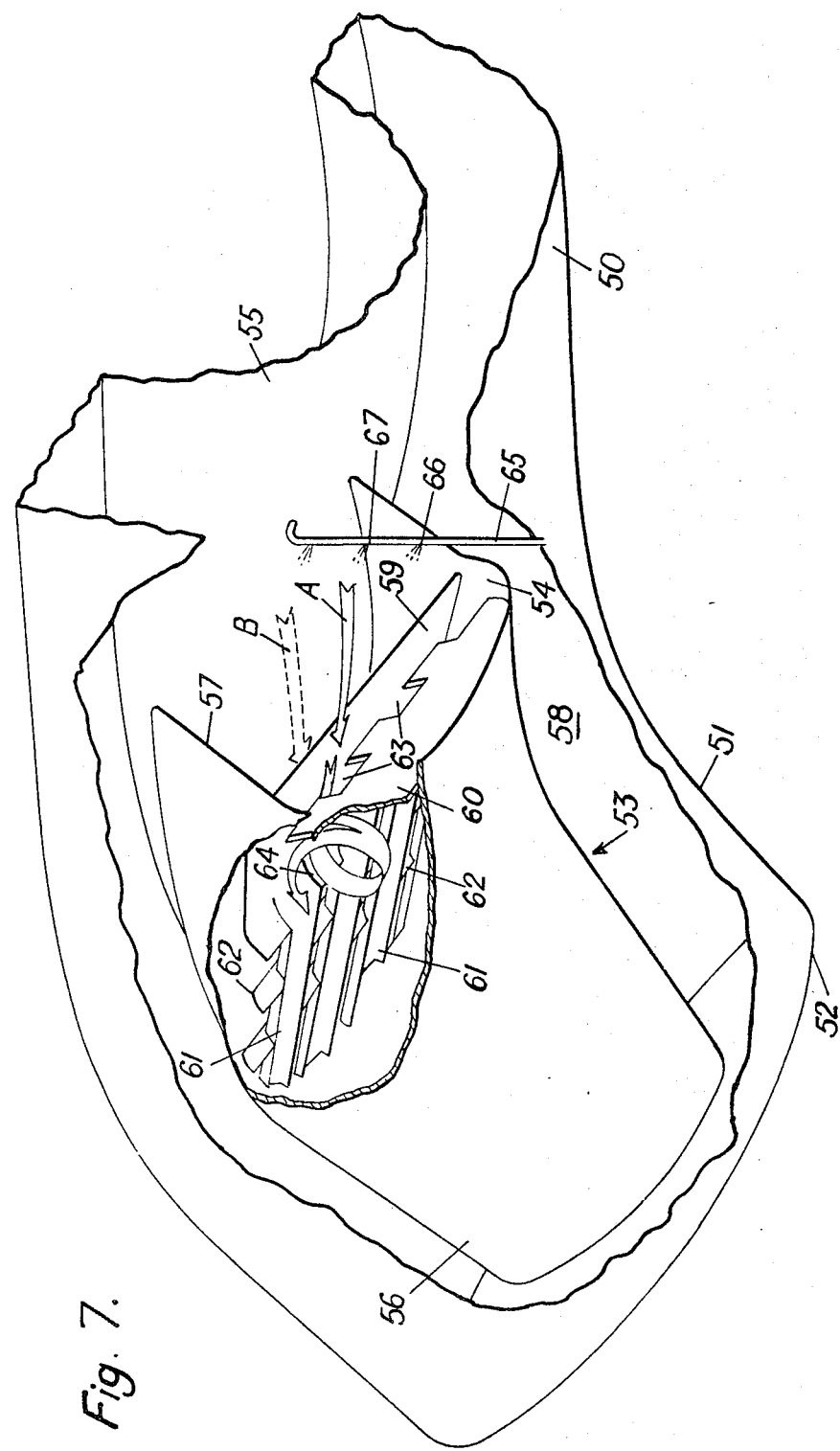

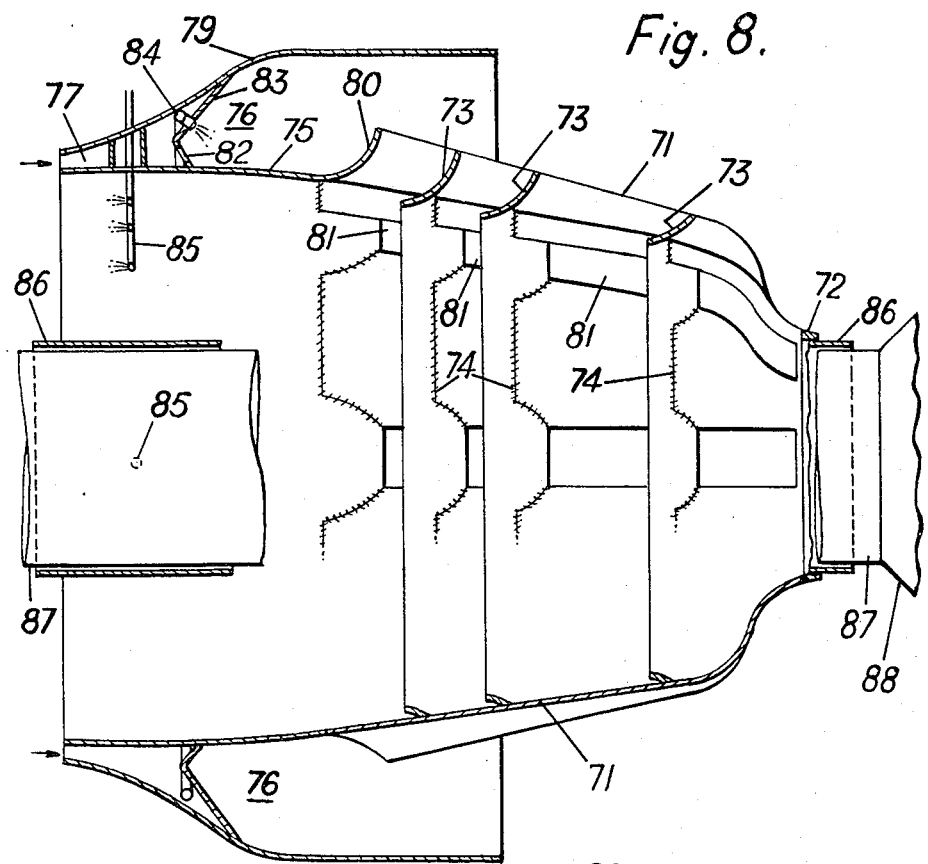
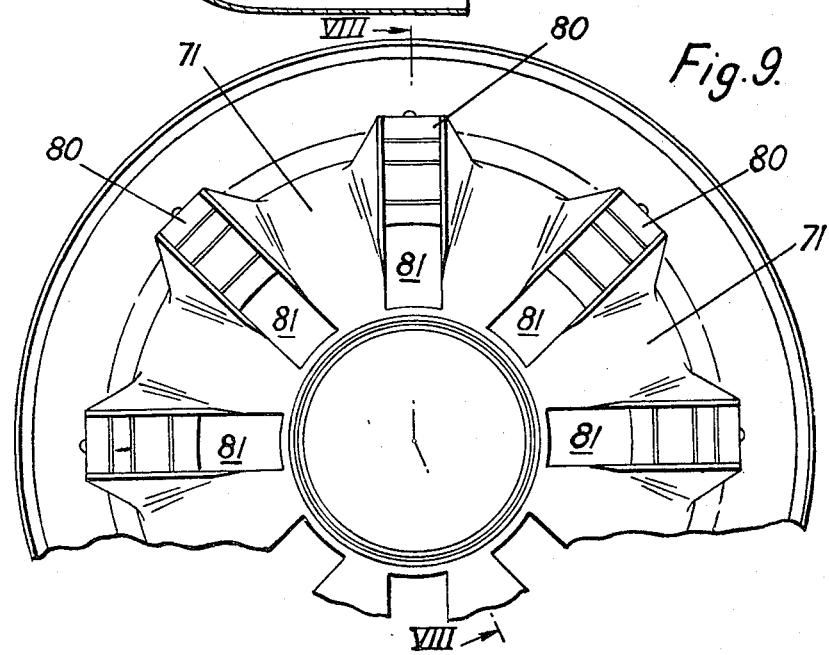

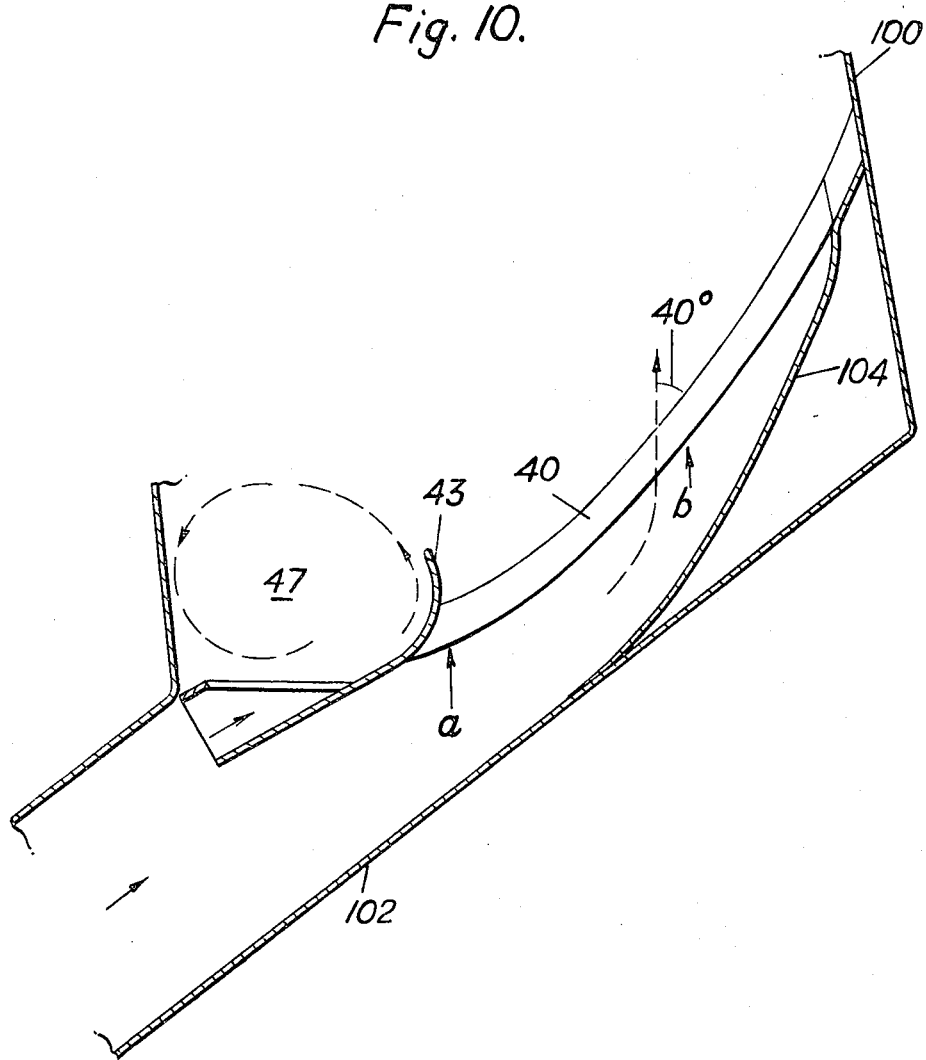

FUEL COMBUSTION IN DUCTED FLOW

This invention relates to the burning of liquid or vapourised fuel in a ducted flow of combustion-supporting gas such as air. The gas may in theory be other than air, but for convenience it will be referred to in this specification simply as "air".

The invention may for example be applied to the air flow through the combustion apparatus of a ramjet engine, or the air flow through an auxiliary combustion apparatus of a gas turbine engine.

According to this invention, a combustion apparatus comprises a duct for containing an axial flow of air and including a mixing device comprising an assembly of spaced longeron members which extend along the duct and are inclined to the general direction of flow through the duct and to the walls of the duct so that a major portion of the flow through the duct will pass between the longeron members; and a baffle extending across the duct at the upstream end of the longeron members and forming behind it a sheltered pilot combustion zone, the baffle being formed with a number of air injection ports downstream of which there are deflecting surfaces for retarding the flow of air from the pilot combustion zone, the burning fuel and air after passing from the pilot combustion zone being mixed with air which passes through the openings between the longeron members.

Examples of forms of combustion apparatus according to this invention are shown in the accompanying drawings. In these drawings:

FIGS. 5 and 6 are respectively a plan view and a sectional side view on the line 6—6 in FIG. 5 of an alternative arrangement having a grid-like mixing device;

FIG. 7 is a diagrammatic perspective view, partly in section, of a further alternative construction including a grid-like mixing device located in an auxiliary combustion apparatus;

FIG. 8 is a longitudinal section along the line VIII—VIII of a different combustion apparatus including an approximately frusto-conical mixing device;

FIG. 9 is a fragmentary end view from the downstream end of the mixing device shown in FIG. 8; and FIG. 10 shows one installation for a curved form of the combustion apparatus shown in FIGS. 5 and 6.

Figure 1:
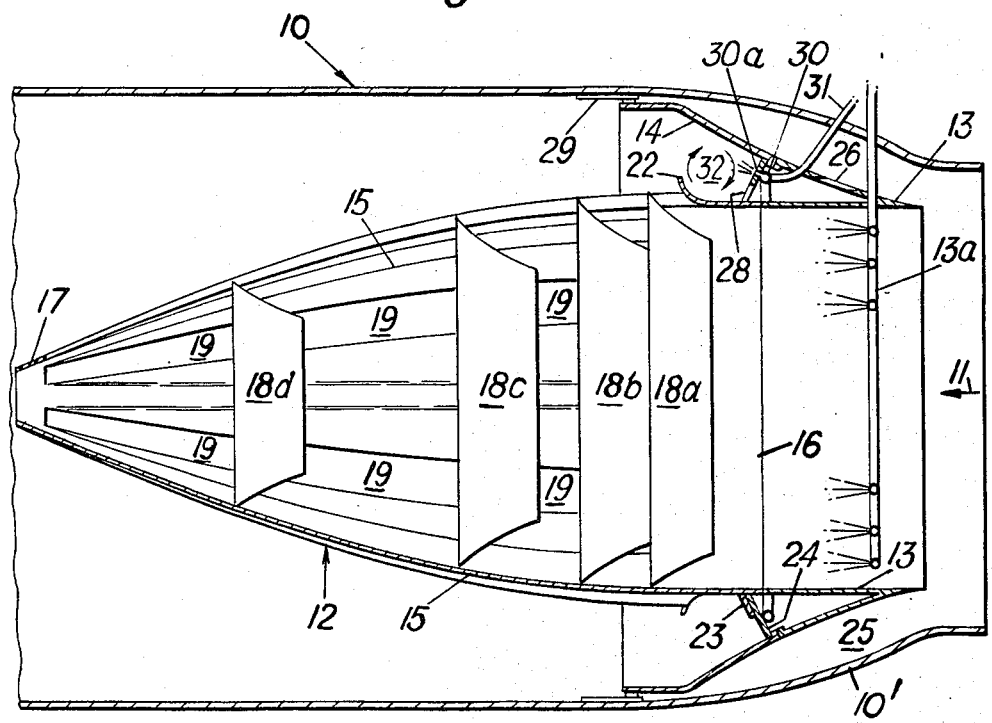
FIG. 1 is a longitudinal section along the planes I—I of FIG. 2 of part of a combustion apparatus having an annular pilot combustion zone and a frusto-conical mixing device for controlling the mixing of the main and pilot streams of air and fuel.
Figure 2:
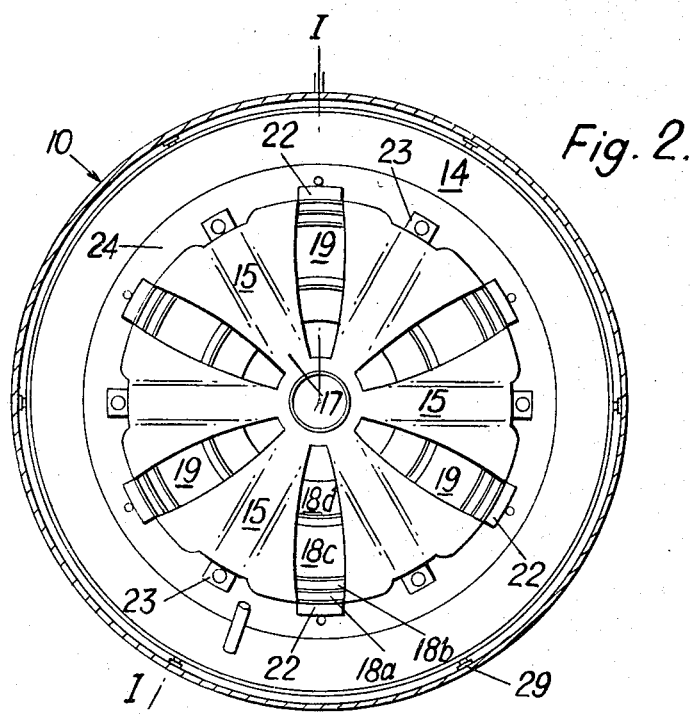
FIG. 2 is an end view of the duct shown in FIG. 1, looking upstream.

An air duct 10 shown in FIGS. 1 and 2 is the combustion section in a ramjet engine, the general direction of flow through the duct being indicated by an arrow 11. The main components of the combustion apparatus are a mixing device 12 of substanially frusto-conical form (hereinafter called a colander), and an annular baffle 13 having a hollow wall of wedge section formed with an annular series of air injection ports 26, 28 for an annular pilot combustion zone 32, and including a shroud 14 mounted at its downstream end on the duct wall 10.

The colander 12 consists of a number of longeron members 15 of outward-facing shallow channel section which extend between upstream and downstream end ring portions 16 and 17 respectively, and enclose a number of axially spaced reinforcing hoop members 18a, 18b, 18c, 18d. A suitable main fuel injection system, represented diagrammatically by a perforated supply pipe 13a, is arranged to inject fuel into the outer regions of the main air flow which passes through the baffle 13 to enter the colander 12.

The upstream hoop members 18a, 18b (and also to some extent the members 18c, 18d) constitute scoop-like deflectors which intercept part of the air-fuel mixture flowing within the colander 12, and discharge it outwards through adjacent openings 19 defined by longeron and hoop members. Downstream from these first two hoop members 18a, 18b, the longeron members 15 converge towards their downstream ends, thus imposing a constrictive effect on the air-fuel mixture flowing through the colander, which forces the major portion of the mixture to escape outwards between the longeron members 15. The central core of the flow entering the colander escapes downstream through the end ring 17.

The adjacent side walls of adjacent longeron members 15 are joined together at their upstream ends by a series of flow-reversing deflectors 22, of concave section, the deflectors 22 in this instance extending outwards to project beyond the side walls of the longeron members 15. A series of circumferentially spaced drilled attachment lugs 23 are mounted on the upstream ring portion 16, for attaching the colander to a drilled downstream end wall 24 of the baffle 13.

The baffle 13 divides the oncoming air flow into a central main portion which passes through the baffle to enter the colander, and an outer minor portion which enters an annular channel 25 between the baffle 13 and a divergent portion 10' of the duct 10. Some of the air which enters the channel 25 flows onwards around the outside of the baffle 13 and the shroud 14, so as to cool them and also to insulate the wall 10 from the pilot combustion zone, whilst the remainder enters the hollow baffle wall through the air injection ports 26 and is discharged from the end wall 24 of the baffle 13 through the annular series of ports 28 which are spaced to alternate with the attachment lugs 23, each port 28 lying opposite the concave surface of a deflector 22.

The downstream end of the shroud 14 is cylindrical and carries a series of circumferentially spaced supporting fingers 29 which extend downstream and are screwed at their ends to the duct wall 10. Thus the entire combustion apparatus is detachably mounted in the duct wall 10.

The hollow wall of the baffle 13 houses an annular manifold 30 which is fed by a fuel supply pipe 31 and which discharges jets of fuel through an annular series of fuel ports 30a, each of which is located in the end wall 24 in radial alignment with an air injection port 28.

The end wall 24, the ring 16, the deflectors 22 and the shroud 14 combine to define an annular pilot combustion zone 32 which is sheltered from the main air-fuel flow entering the ring 16 and the colander 12. Ignition means (not shown) are provided for initiating combustion in the pilot combustion zone 32.

In operation, the air jets discharged from the injection ports 28 and the fuel jets discharged from the adjacent ports 30a, impinge on the deflector 22 and are deflected outwards and backwards so as to strike the shroud 14 and be deflected inwards, as indicated by the arrows in the zone 32. The air-fuel charges are ignited as toroidal vortices in the zone 32. The recirculatory flow in the zone 32 not only assists mixing of the air and fuel, but also ensures that the mixture remains in the zone sufficiently long for the pilot combustion to take place.

Figure 3:
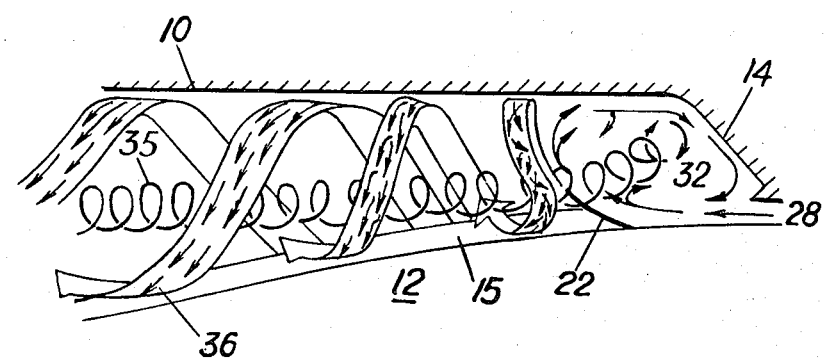
FIGS. 3 and 4 are flow diagrams showing the approximate relationship between separate cores of combustion gas from one part of the pilot combustion zone and the surrounding vortices of secondary air and fuel discharged from the interior of the mixing device, FIG. 3 being a longitudinal section and FIG. 4 a plan view.
Figure 4:
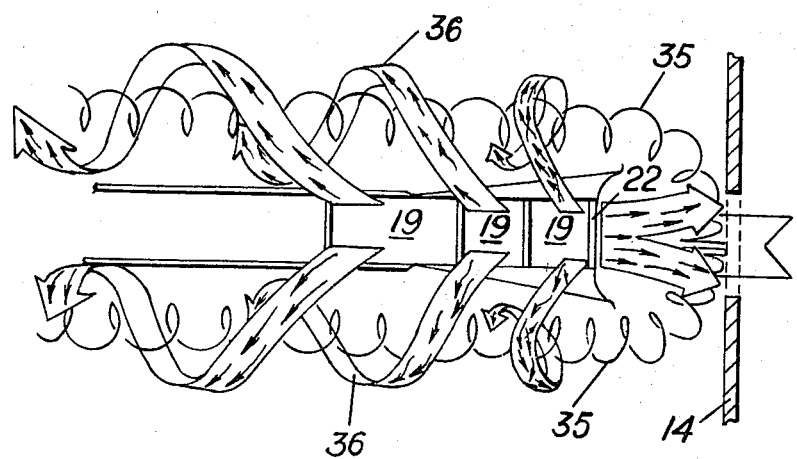

As shown in FIGS. 3 and 4, the swirling burning gas in each sector of the pilot zone 32 escapes downstream by dividing into separate flows 35 which pass on either side of the deflector concerned, and thus each of the divided flows 35 follows the path of a longeron member. Meanwhile the main air-flow mixture within the colander 12 is in part intercepted by the upstream hoop member 18a, 18b and deflected outwards from the colander, and subsequently in part forced outwards from the colander through the openings 19 by the constrictive action of the convergent downstream end of the longeron members 15. It is believed that the flow separation from the longitudinal edges of the longeron members 15, coupled with a suction effect in the outer trough-like regions of the longeron members, induces the outward flow of air-fuel mixture to return to the longeron members and thus flow along vortical flow paths 36 which blend with the vortical flow paths 35 of the burning gas from the pilot combustion zone 32.

Thus the separating effect of the deflectors 22 on the air-fuel discharge from the pilot combustion zone 32 causes the burning mixture vortices 35 to follow the channels of the longerons 15, which act as flame stabilizers, whilst the envelopment of the circumferentially separated vortices 35 by the vortices 36 of the main air-fuel mixture from within the colander promotes stable propagation of the flame through the successive layers of the air-fuel mixture in the annular passage surrounding the colander.

In FIGS. 5 and 6 the mixing device comprises a grid of transversely spaced, longitudinally extending longeron members 40 of channel section which are connected together at their downstream ends to a transverse stiffener 41 and are welded at their upstream ends to a plate 42. The downstream edge portion of the plate 42 is bent outwards in the spaces between adjacent pairs of adjacent longeron members 40 to provide a series of concave flow-reversing deflectors 43. At its upstream end, the plate 42 carries a baffle consisting of a slightly curved portion 44, which is convex away from the plate 42, with a series of forwardly extending supporting legs 45 which are inclined to meet the plate 42 and obstruct the flow. The legs are spaced transversely to provide between them air injection ports 46 which lie opposite the deflectors 43.

A pilot combustion zone 47 is provided with fuel injectors and a fuel igniter, neither of which are shown. Streams of air enter the zone 47 through the passages 46 and pick up the injected fuel; they are then reversed by the deflectors 43 so as to form vortices of burning gas, which escape downstream between the deflectors 43.

FIG. 10 shows how a curved form of this mixing device may be used. Combustion takes place in a main duct 100, which is of circular cross-section, after entering through an inclined inlet duct 102 of approximately elliptical crosssection. The curving of the grid in the manner shown in FIG. 10 is intended to even out the through-flow distribution along the duct. To this end the grid is made to project into the flow at a to increase the amount of flow through the grid in that region, and it curves away in the opposite sense in the region b to decrease the flow through the grid in that region. The flow through the grid in this last region, namely towards the downstream end of the grid, may be further decreased by increasing the widths of the longerons 40 progressively towards their downstream ends. The curvature of the grid in the region b also has the effect of maintaining a substantially constant flow approach angle to the grid, the angle being about 40°, which we find promotes stable flow characteristics.

In FIG. 7 the invention is applied to a gas turbine jet engine of the kind in which a low pressure compressor feeds not only a high pressure compressor but also one or more short ducts branching off laterally from the annular delivery casing of the low presure compressor, each duct terminating in a nozzle which is rotatably mounted to orientate its discharge relatively to the engine. An engine of this construction is described in our patent application No. 176,745, corresponding to British patent application No. 8094/61. FIG. 7 shows a section of the delivery casing 50 which communicates with a starboard branch duct 51 which is downwardly and rearwardly inclined. The downstream end 52 of the branch duct 51 terminates in a rotatably mounted nozzle (not shown).

In order to increase the thrust of the discharge from the branch duct nozzle, an auxiliary combustion apparatus is provided in the duct upstream of the nozzle, which apparatus has a bent combustion duct 53 defined partly by a channel-shaped section 54 with side walls 57, and a wall 55 which is part of a casing which feeds part of the low pressure air to the high pressure compressor. The combustion duct is completed by a substantially frustoconical section 56. The walls 57 of the channel-shaped section support the combustion duct by virtue of being secured to the walls 55.

It will be seen that the channel section 54 is designed to catch the required proportion of the air-fuel flow for the combustion duct. Further air flows through a by-pass 58 to cool the walls of the ducts 51, 53 before leaving the downstream outlet of the branch duct. The air-fuel flow entering the combustion duct is divided into a pilot stream (arrow A) and a main stream (arrow B) by a plate 59 which is mounted at its sides in the walls 57 of the channel section. A baffle 60 is mounted on the plate 59 and is inclined at an acute angle to the upstream portion of the plate 59, and at the downstream portion the baffle 60 supports a grid of longeron members 61 of channel section, whose downstream ends contact the wall of the combustion duct 53 at the region where the channel section meets the frusto-conical section 56. The inclination of the grid and its supporting plate 59 towards the flow in the combustion duct means that the main stream of air-fuel mixture entering the duct 53 flows into a narrowing passage and is consequently forced out between the longeron members 61, which members are provided with transverse stiffeners 62 having concave surfaces which assist the discharge between the members 61.

The baffle 60 is cut away to provide a series of injection ports 63 through which the air-fuel mixture passes to impinge on a series of flow-reversing deflectors 64 located between the upstream ends of the longeron members 61. The air-fuel mixture is ignited in the sheltered pilot combustion zone immediately downstream of the baffle 60, and the burning gas escapes downstream between the deflectors 64 and follows substantially the channels of the longeron members 61; it then becomes enveloped by the main airfuel mixture discharged through the grid.

In order to promote the growth of vortices in the main air-fuel mixture passing between the longeron members, the longeron members preferably increase progressively in width towards their downstream ends (in a manner not shown in the drawing).

The fuel may be supplied to the air entering the combustion duct 53 by means of a series of fuel pipes with open ends turned to face upstream, the pipes being spaced transversely across the entry of the duct 53, one such pipe 65 being shown. Each pipe may have a fuel outlet 66 for the pilot stream and one or more fuel outlets 67 for the main stream.

The mixing device shown in FIG. 7 may be replaced by the device shown in FIG. 10.

The combustion apparatus shown in FIGS. 8 and 9 is generally the same as the apparatus shown in FIGS. 1 and 2, the main difference being that it has longeron members 71 which curve sharply inwards at their downstream ends, which are welded to an end ring 72. There are three stiffening hoops 73 which assist the outward flow of the air-fuel mixture from within the colander through openings 81 between the longeron members. The hoops have slots in which the longeron members are welded, the welds lines being shown at 74. The upstream ends of the longeron members are welded to a tubular part 75 which has outwardly bent tabs 80 serving as flow-reversing deflectors; the tabs 80 lie between, and are welded to, the upstream ends of the longeron members.

Air enters a pilot combustion zone 76 through an annular space 77 between the tubular part 75 and a shroud member 79, and through air-injection ports 82 in a baffle plate 83. Fuel is injected into the pilot zone 76 by injectors 84 aligned with the ports 82, and fuel is also injected into the main air stream by injectors 85.

A cylindrical tube 86 (partly shown) extends all the way through the mixing device, and within the tube 86 there is an axially slidable stalk 87 (also only partly shown). The stalk 87 carries a conical centrebody 88 which co-operates with an outlet nozzle so that the area of the outlet passage varies in accordance with the axial position of the centrebody 88.

The apparatus shown in FIGS. 8 and 9 may be mounted within a duct in the manner shown in FIG. 1, with provision for the flow of air around the outside of the shroud 79 so as to cool the shroud. The combustion apparatus shown in FIGS. 8 and 9 is particularly suitable for a hypersonic ram jet engine operating at a combustion temperature of about 2000° C.

We claim:

1. Combustion apparatus comprising a duct for containing a flow of air and including an air-fuel mixing device comprising an assembly of transversely spaced longeron members which extend along the duct and are inclined to the general direction of flow through the duct and to the walls of the duct so that a major portion of the flow through the duct will pass through the spaces between the longeron members, longeron member having longitudinal edges adapted in operation to shed continuous vortices, and a baffle extending across the upstream end of the longeron members and forming behind it a sheltered pilot combustion zone and means adapted to generate pilot vortices of combustible mixture in the pilot zone, to cause each pilot vortex to divide, and to direct the divided portion of each pilot vortex to pass downstream along adjacent parts respectively of adjacent longeron members.

2. Combustion apparatus according to claim 1 in which the mixing device has an approximately frusto-conical shape formed by circumferentially spaced longeron members converging downstream, the pilot combustion zone being an annular space behind an annular baffle around the upstream end of the mixing device.

3. Combustion apparatus according to claim 2 in which the longeron members are connected by hoop members which are of concave section so as to deflect gas from within the mixing device outwards, through the spaces between the longeron members, to the outer annular space in which it will mix with burning gas from the pilot combustion zone.

4. Combustion apparatus according to claim 2 in which the longeron members are of outward-facing shallow channel section.

5. Combustion apparatus according to claim 1 in which the mixing device is in the form of a grid formed by longeron members lying parallel to one another and obliquely across the duct.

6. Combustion apparatus according to claim 5 incorporated within a main duct leading to the discharge nozzle of a gas turbine jet engine, the duct of the combustion apparatus being arranged to receive part of the gas flow in the main duct, the remainder of the flow bypassing the combustion apparatus and joining with the discharge from the combustion apparatus prior to discharge through the nozzle of the engine.

7. Combustion apparatus according to claim 5 in which the grid is inclined to the main approach flow at an angle of about 40°.

* * * * *